Patented Sept. 12, 1939

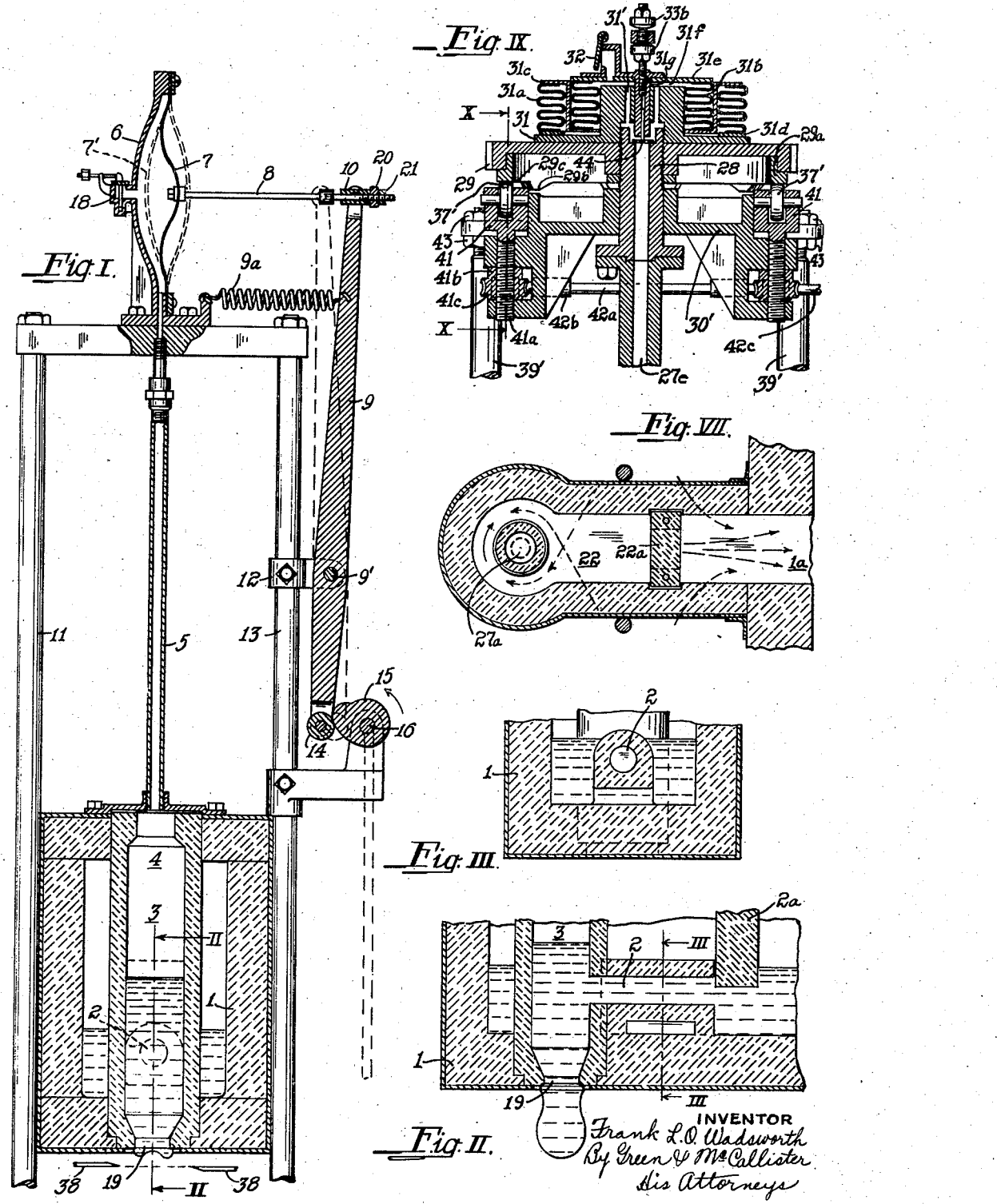

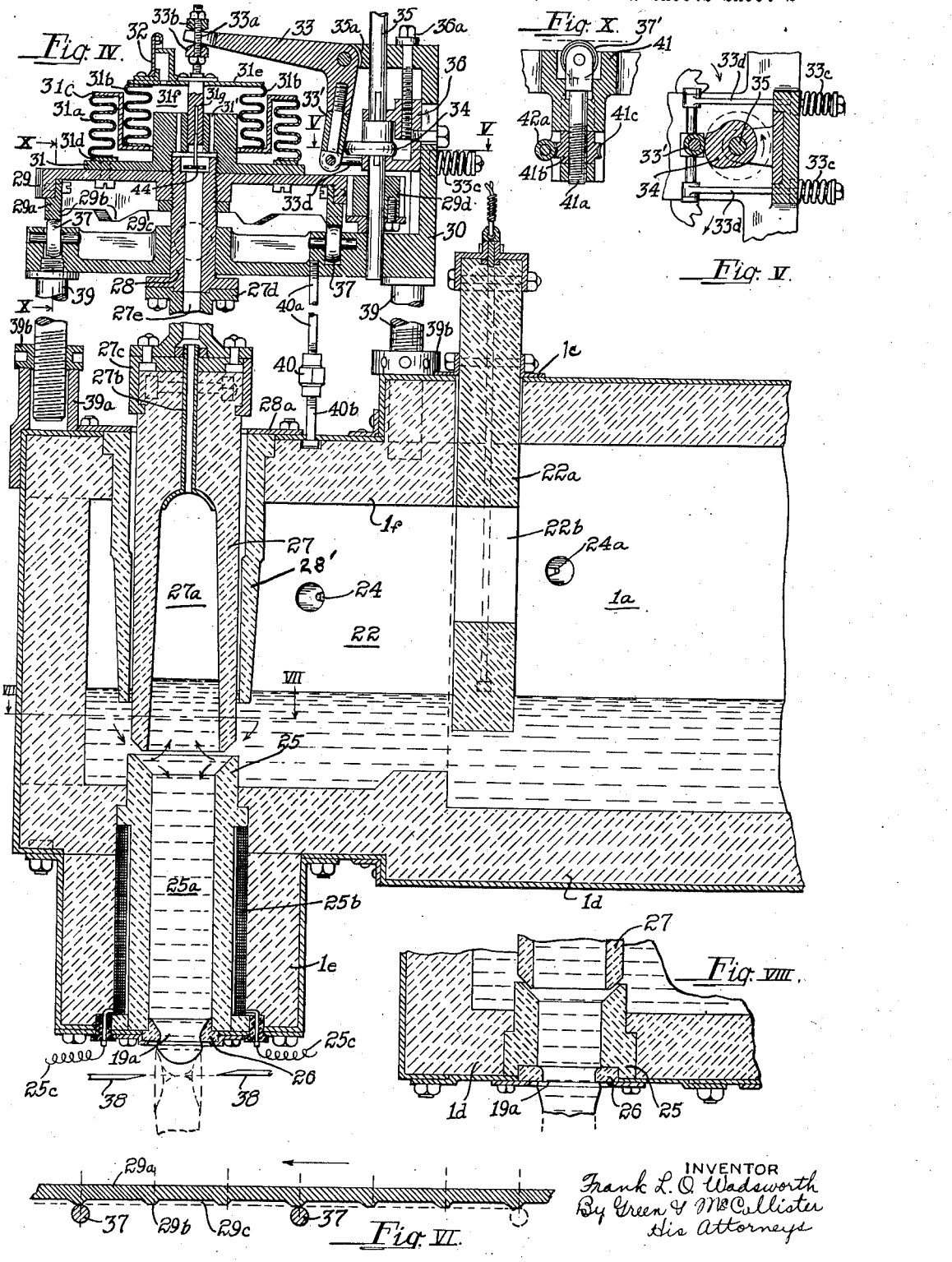

2,172,895

UNITED STATES PATENT OFFICE 2,172,895

APPARATUS AND PROCEDURE FOR FEEDING MOLTEN GLASS

Frank L. O. Wadsworth, Pittsburgh, Pa., assignor to Ball Brothers Company, Muncie, Ind., a corporation of Indiana Application March 15, 1935, Serial No. 11,227
Renewed May 21, 1937

21 Claims. (Cl. 49—55)

This invention relates to the art of feeding molten glass and more particularly to an improved apparatus and method for delivering molten glass in the form of a series of successive mold charges, each of which is of a predetermined size, weight and shape, such as are required or desirable in connection with the particular article fabricating procedure or mechanisms employed.

Glass feeders may be divided into two general classes, viz., "natural flow" feeders in which the molten material is delivered from any suitable source of supply in either a continuous or intermittent stream under the action of gravity alone; and "forced flow" feeders in which the action of gravity is either opposed or aided—or alternately opposed and supplemented—by externally applied forces. Both of these classes of feeders have their own inherent advantages and are extensively used in connection with different forms of fabricating or forming machines.

One object of my invention is to produce a feeder which has the advantages of a natural flow feeder, in which the molten glass is expelled or extruded from the feeder orifice under the action of gravity alone, but under a periodically increased gravity head which will accelerate the extrusion at regular recurrent intervals, without the application of any outside force or pressure on the flowing material. A procedure such as above outlined enables me to avoid certain difficulties and disadvantages sometimes encountered with forced flow feeders, where the rate of delivery or expulsion of the molten material is in large part controlled by externally imposed forces, which may themselves vary in magnitude, and whose action is affected in marked degree by variations in the temperature or other physical characteristics (viscosity, etc.) of the molten material.

Another object of my invention is to provide a feeder which is of simple self-contained construction; is easily controlled in operation; and is readily adjustable to vary its rate of delivery, for the purpose of obtaining a series of uniformly dimensioned mold charges (stream sections) of the desired shape and weight.

Other objects and purposes of the present invention will be made readily apparent to any person skilled in the art from an examination and consideration of the exemplary embodiments thereof which are illustrated in the accompanying drawings in which:

Figure I is a vertical section, in the plane of the orifice, of a forehearth, equipped with a feeder operating in accordance with the principles of my invention;

Fig. II is a section taken on the plane II—II of Fig. I;

Fig. III is a section taken on the plane III—III of Fig. II;

Fig. IV is a vertical section of another feeder illustrating another exemplification of my invention;

Fig. V is a section taken on the plane V—V of Fig. IV;

Fig. VI is a developed view of the cam track employed for raising and lowering the air bell;

Fig. VII is a section taken on the plane VII—VII of Fig. IV;

Fig. VIII is a partial view in vertical section illustrating another type of forehearth construction;

Fig. IX is a partial sectional elevation illustrating another exemplification of my invention; and Fig. X is a section taken on the plane X—X of Fig. IX.

The procedure constituting a part of the present invention involves controlling the flow of molten glass through a submerged flow orifice in such a way as to produce, by a timed severing operation, mold charges of the desired size and weight and of requisite shape to enter a mold and be effectively processed while in the mold. This procedure involves the periodic application of a lifting force to the mass of molten glass above the orifice, but only for the purpose of momentarily checking the flow therethrough and concurrently increasing the gravity head of the mass thereabove.

The feeder shown in Figs. I, II and III resembles in some respects the construction illustrated and described in the Hitchcock Patents Nos. 805,067 (Re. No. 13,929) and 805,068; and to facilitate the comparison of my improved feeder with that of Hitchcock, I will indicate various parts of the herein described apparatus by the same reference numerals as are employed to designate similar or corresponding members of the Hitchcock patent apparatus. Thus:

I indicates a suitable receptacle, or reservoir, which contains the parent or supply body of molten glass; 3 is a vertical chamber, which is positioned near the front end of the reservoir I, and whose walls may be surrounded and kept at the proper temperature either by an electrically heated body of insulating material (as described by Hitchcock) or by the body of molten glass in the reservoir itself (as here shown); 2 is a horizontal passageway which leads from the body of glass in the receptacle I to the chamber 3; 5 is a vertical conduit connected, at one end, to the cap or plate which covers the upper end of the chamber 3, and at the other to a diaphragm shell 6, that is covered and closed by the flexible diaphragm 7; and 8 is a metal rod which is secured to the center of the diaphragm disc 7 and is provided at its outer end with an adjustable washer and lock nut 20—21 that is engaged by a sleeve 10 pivotally secured to the upper end of a lever 9.

The lever 9 is rockably supported, at an intermediate point in its length, on a pivot pin 9' which is carried by a suitable bracket 12 that is clamped on one of the vertical side posts 13 of the forehearth frame. The lower end of this lever is provided with an anti-friction roller 14 and is engaged by a single acting or "one-way" cam 15, which is keyed to a cross shaft 16, that may be driven by any suitable variable speed motor (not shown). The upper end of the lever 9 is coupled to the base, or support of the diaphragm casing 6, by a relatively light spring 9a, whose tension is sufficient to overcome the frictional resistance to the inward or return movement of the lever member 9, and thus maintain the cam elements 14—15 in operative engagement; but this spring cannot act on the connected diaphragm elements 20—21—8—7; and cannot therefore produce any mechanical compression of the air in the diaphragm chamber. The creation of a superatmospheric pressure in this chamber—(or in the conduit and chamber 5—3, connected therewith)—from any other cause (e. g. such as a change in temperature therein) is also prevented by the pressure of a light sensitive check valve 18, which is mounted in the rear wall of the diaphragm casing 6, and which is so supported and balanced that it will open whenever the pressure in the enclosed spaces 3—5—6—7 tends to rise to the slightest degree above that of the external air.

When the diaphragm 7 is moved outwardly—(by the engagement of the cam actuated lever elements 9—10, with the rod elements 20—21—8)—the relief valve 18 is immediately closed, and held shut, by the partial vacuum that results from the enlargement of the diaphragm chamber.

The characteristic mode of operation of my improved variable head natural flow feeder will now be readily understood. The parts are so proportioned and adjusted that at each revolution of the cam 15 the diaphragm 7 is left free to return, if necessary, to the extreme dotted line position 7'; (where the end of the rod 8 is against the rear wall of the diaphragm casing 6), and in this position the level of the glass in the chamber 3 is substantially the same as that in the main supply reservoir 1;—this level being determined by the relative rates of free (gravity) flow through the passageway 2 and the delivery orifice 19 at the bottom of the chamber 3. As the cam revolves the upper end of the lever 9 moves outwardly and the sleeve 10, comes into engagement with the members 20—21 (the time of this engagement being determined by the setting of these adjustable elements on the rod 8)—and the diaphragm 7 is drawn forward to create a partial vacuum in the upper end (4) of the chamber 3; and the inflow of glass through the passage 2 is accelerated, while the outflow from the delivery orifice 19 is concurrently retarded or arrested.

The above described action results in a periodic lifting of the level of the molten material in the delivery chamber and a corresponding increase in the gravity head or pressure above the delivery outlet; the increase being governed by the range of the suction stroke; i. e., by the adjustment of the rod elements 20—21. When the high point on the cam 15 passes out from under the cam roller 14, the spring 9a immediately draws the sleeve 10 back out of engagement with the rod elements 20—21, and leaves the diaphragm 7 free to be returned to a position of dynamic equilibrium by the pressure of the atmosphere on its outer surface. During this phase of operation the glass resumes its free unrestricted flow from the delivery orifice under the action of a progressively decreasing gravity head, without being subjected to the influence of any superimposed external force or pressure, and without being affected by any variations or irregularities of action that might result from changes in such external influences if they were present.

The period of this free natural gravity flow from the delivery orifice 19—and the accompanying gradual decrease in the gravity head established by the preceding vacuum stroke of the diaphragm pump—is controlled by the time of revolution of the cam 15; and this may be varied, as previously explained, by the speed of the driving motor. But whatever this period may be the diaphragm 7 will, during this interval, be automatically moved inwardly, under the pressure of the external air on its outer surface, so as to maintain a corresponding atmospheric pressure condition in the delivery chamber 3, independently of the relief action of the check valve 18. The outward movement of the diaphragm 7 is therefore immediately effective in initiating the suction action on the glass in the chamber 3, regardless of what the level therein may then be, and regardless of when or where this outward movement begins; while the range of this outward movement is definitely limited and controlled by the adjustment of the diaphragm-rod elements 20—21.

If the time interval of free gravity delivery is increased, by decreasing the speed of revolution of the cam 15, the glass will fall to a lower level in the chamber 3 (but never substantially below the glass in the main supply chamber 1), and the diaphragm 7 will move inwardly by a correspondingly greater amount; so that on the next positive suction stroke the lever sleeve 10 will "pick up" the diaphragm rod element 20—21 at an earlier point in its stroke and, by the increased movement thus obtained, raise the glass in the chamber 3 to a correspondingly higher level. If the interval of free gravity flow is decreased, (by increasing the speed of the cam 15) the drop of the glass in the delivery chamber will be less, and the inward movement of the diaphragm 7 is reduced, thereby delaying the engagment of the elements 10 and 20—21, on the succeeding outward movement of the cam actuated lever 9, and correspondingly decreasing the length and the lifting action of the suction stroke of the diaphragm.

The amount of glass drawn into the delivery chamber, at each outward movement of the diaphragm member 7, is thus automatically proportioned to the amount discharged therefrom during the succeeding delivery interval; and with a proper adjustment of the members 20—21, the maximum level or "head" of the molten material above the delivery orifice can never exceed a controlled and predetermined height. On the other hand, this level can never fall materially below that which is maintained in the supply reservoir 1; and the conditions of uniform and controlled outflow from the delivery orifice 19 are more easily established and maintained than is possible when the outflowing glass is subjected to a superatmospheric pressure resulting from a forced inward movement of the diaphragm 7 (as contemplated by Hitchcock).

The elimination of the forced return stroke of the diaphragm members—which results from the use of a single acting cam 15 in place of the double acting cam 20 of the Hitchcock patent construction—and the consequent avoidance of any built up superatmospheric pressure in the chamber 3, (which is also ensured by the supplemental provision of the relief valve 18), has other advantages. If the glass in the delivery chamber is subjected to a superatmospheric pressure, which is too great, or too long continued, the molten material will be forced down below the top of the supply passage 2, and a portion of the compressed air will be blown back into the supply reservoir and create a frothy condition that seriously interferes with the proper operation of the feeder. This is a difficulty which is not infrequently experienced with many forms of compressed air feeders.

Another advantage of eliminating any compression of the air in the delivery chamber of my improved apparatus is this: Feeders of the character now under consideration operate on what is known as the "closed system principle"; i. e., the upper end of the accumulation-delivery chamber and the pump chamber connected thereto are intended to form a closed space into which no air is introduced from an external source, and from which no air is allowed to escape;—the desired changes in pressure in this space being produced only by its successive enlargement and contraction. But this condition is one that it is very difficult to maintain; and if on each compression stroke of the pump a small amount of the confined air is allowed to escape (through semi-porous portions of the exposed walls of the delivery chamber (3) or through leaky joints in the pump connection (5) etc.) the "vacuum" effect will gradually build up and will ultimately lift the molten material high enough to choke the opening to the pump, and thus prevent any further operation of this part of the apparatus. If, on the other hand, air is drawn into the "closed system" during the suction stroke of the pump, the vacuum effect will be reduced, and the expulsion effect of the succeeding compression stroke will be augmented. In both cases, therefore, there is an irregularity and consequent uncertainty of action that is detrimental to the uniform long continued operation of the feeder.

In my improved form of construction no building up of pressure in the closed chamber pump space can ever occur, and any gradual diminution of the "vacuum" effect can always be at once compensated by an inward adjustment of the washer lock nut elements 20—21; and, when the limits of this adjustment have been reached, by a single forced inward stroke (manually produced) of the diaphragm rod 8.

My invention also differs from the disclosure of the Hitchcock patents in that I provide an adjustable gate 2a for controlling the delivery of molten glass from the main forehearth to the delivery chamber 3. As shown in Fig. II, this gate controls the delivery of glass from the main source of supply to the passage 2, and thus I am able to obtain a further control over the flow through the orifice. This gate may also be employed for shutting off the delivery of glass to the chamber 3 and consequently the orifice 19 while the feeder is not in operation.

I, of course, employ the usual burners or equivalent heating apparatus to maintain the glass at the proper temperature, both in the main forehearth and in the passage 2 and chamber 3.

In Figs. IV—VII, I have shown a modification of my invention having several other improved features, which are not disclosed or suggested by the Hitchcock patents and which operates on the same principle as the one first described; i. e., the principle of eliminating or preventing the application of any superatmospheric pressure, or other force, which would supplement the effect of gravity in accelerating the discharge of glass from the delivery orifice.

In this second illustrative embodiment of my present improvements the tank extension, or receptacle, which contains the parent supply body of molten glass, differs from the usual form of structure employed for such purposes in that it consists of two separable parts, or portions: viz. (1) a main forehearth housing, or "boot", which comprises an outer shell or casing of highly polished sheet metal—(e. g. nichrome or stainless steel), suitably united and reinforced at the corners by angle irons, etc., and a thick lining of refractory and heat insulating material 1d; and (2) a subforehearth structure of similar construction; which is detachably bolted to the floor of the main boot, and which may be either entirely removed therefrom (as indicated in Fig. VIII), or may be readily replaced by another of different depth or form, without altering the main portion of the forehearth assembly. One of the important advantages of this two-part construction is that it enables me to easily vary the height, or gravity head, of the glass above the delivery orifice—and thereby increase or decrease the natural free flow therethrough—without changing the level of the parent supply body of molten material in the main tank extension, and without altering the degree of lifting action to which the glass above the orifice is periodically subjected.

Another advantage of this separable subforehearth arrangement is that it permits of the easy repair or replacement of those parts which contain and surround the delivery orifice—which is at the lower end of the subforehearth chamber)—and which are most subject to the attrition and corrosive action of the outflowing stream of molten glass.

The main forehearth chamber is divided into two compartments, 1a and 22, by a vertically adjustable gate 22a, whose lower end dips into the molten pool of glass, and whose upper end is engaged by a pair of angle plates 1c that rest on the roof of the forehearth boot, and serve both to support the gate member 22a at any preadjusted height, and to also seal the openings between the gate block and the aperture through which it passes. Both of the main forehearth compartments, 1a and 22, are heated by two or more suitable burners 24a and 24; and the latter are preferably so arranged—as indicated in dotted lines in Fig. VII—as to direct the streams of burning fuel forwardly against the somewhat enlarged semi-cylindrical end of the chamber 22, from which they are deflected and reflected backwardly toward the rear compartment 1a. In order to permit of the free circulation of the heated gases of combustion through the main forehearth chamber the gate 22a is provided with a large port opening 22b, whose lower edge is above the surface of the molten pool of glass, for all positions of the gate and which is of adequate area to provide for the free passage of burned gases from the chamber 22 back into the furnace, and thence to the furnace stack.

The glass delivery orifice 19a is located in the floor of the subforehearth, and is positioned well below the level of the glass within the delivery chamber 22, for the purpose of obtaining the advantage of a substantial head of glass over the orifice, and thus obtaining a more rapid natural flow therethrough than is obtained under normal gravity flow conditions in the ordinary feeder. In order to permit the glass to pass from the chamber 22 to the delivery orifice 19a, communication, between that chamber and the orifice, is established by means of a sleeve 25, which is preferably formed of ceramic material and for structural reasons is preferably cylindrical. The internal bore 25a of this sleeve is of somewhat greater diameter than the orifice, and its lower end is adapted to receive an orifice bushing 26, which may be removably secured in place by any suitable means, such as a metallic clamp ring and suitable bolts for securing the ring in place.

The chamber or passageway 25a constitutes a subforehearth chamber and the sleeve 25, within which it is formed, preferably projects above the upper surface of the refractory lining 1d, in the floor of the main forehearth and the delivery chamber 22. The upper end of this sleeve is however located well below the normal level of the glass within the chamber 22 and its lower portion is surrounded by a refractory block 1e, whose inner diameter is greater than the sleeve and which is provided with suitable heating means, such as an induction coil 25b, the terminals 25c of which may be connected to any suitable source of electric energy.

For the purpose of controlling the flow of molten glass from the chamber 22 to the chamber 25a, I provide an inverted bell 27, which projects downwardly through a suitable aperture formed in the roof block 1f and below the level of the glass contained within the chamber 22, and which is aligned with the sleeve 25. This bell is normally maintained in spaced relation from the sleeve 25; and the adjacent ends of the two members 25—27 are complementarily beveled, so as to more or less direct the normal gravity flow of glass from the chamber 22 downwardly into the subforehearth chamber 25.

For the purpose of sealing the aperture in the roof block 1f through which the sleeve 27 projects, I have provided a sleeve 28' located and supported within the roof block aperture, surrounding the bell 27 and projecting downwardly below the level of the molten glass within the chamber 22. As shown, the supporting shoulders of this sleeve and its locking plate 28a are so arranged that the sleeve may be readily removed for replacement and other purposes.

The bell 27 is provided with an internal cavity 27a, which may be termed a segregation chamber; and the upper end of this cavity communicates with the passage in a tubular bolt 27b which serves as a metal reinforcement for the upper portion of the bell structure, and may also be employed for the purpose of securing a metallic cap 27c to the upper end of the bell. The cap 27c is secured to a hollow coupling sleeve 27d which is, in turn detachably connected to a tubular shaft or spindle 28 that is rotatably mounted in an overhead frame 30.

In the embodiment of my invention illustrated in Fig. IV, the bell 27 is adapted to be rotated, and also to be periodically reciprocated away from and toward the sleeve 25. As here shown, the shaft member 28 is secured to and carried by a gear 29; and this gear is supported on a series of rollers in such a manner that as it revolves it is periodically raised and lowered to impart a corresponding rotary and reciprocatory movement to the interconnected members 28—27d and 27; this combined movement being guided in part by the roller supports for the gear 29 and in part by the head frame bearing for the shaft 28.

The interconnected tubular members 27b—27d and 28 form a continuous passage 27e which leads from the segregation chamber 27a to the upper end of the member 28; and for the purpose of controlling and periodically reducing the fluid pressure within the bell 27, this passageway 27e is connected with the interior of an expansible and collapsible Sylphon bellows which is mounted on the gear 29 and revolves therewith.

As here shown, the shaft member 28 extends through the gear 29 and is screw threaded at its upper end for the purpose of securing it to the gear, and also for the purpose of engaging a flanged cap nut 31, which performs the double function of serving as a lock nut, for the connected elements 28—29, and also as a base plate for the Sylphon bellows. The latter is preferably made up of two corrugated sheet metal cells 31a and 31b, that are mounted in telescopic relationship and are connected in series by means of an annular Z-shaped sleeve 31c, one flange of which is secured to the upper end of the outer Sylphon member 31a, and the other flange of which is secured to the lower end of the inner Sylphon member 31b. The outer member 31a is hermetically sealed to the cap nut 31 by means of screws which extend through the gear 29 and the flange of the cup nut and engage an annular base ring 31d on the lower end of this member.

The Sylphon elements 31a and 31b are both preferably secured to the flanged sleeve 31c by means of brazing or welding, and the base ring 31d is similarly connected to the element 31a. A head piece 31e is likewise sealed to the upper end of the inner Sylphon 31b, but this head is provided with an outwardly opening vent or relief valve 32, which corresponds in function to the valve 18 of the first described embodiment. In order to complete communication between the segregation chamber 27a and the interior of the compound Sylphon—i. e., the chamber 31f—the cap nut 31 is provided with a series of apertures 31', which communicate at their lower end with the passage 31e and at their upper end with the chamber 31f.

The variation in volumetric capacity of the chamber 31f is accomplished by expanding and contracting the Sylphon or bellows elements 31a and 31b. The arrangement is however such that while an expansion of the bellows members (i. e., an enlargement of the chamber 31f) occasions a reduction in the air pressure above the glass in the segregation chamber 27a, a contraction of these members does not increase the pressure in the chamber 31f or in the segregation chamber 27a above atmospheric pressure. This is due to the fact that I employ the relief valve 32, which, as here illustrated, consists of a nicely balanced vertical flap valve so arranged that it will open, and establish communication between the interior of the chamber 31f and the external air, as soon as the pressure in that chamber exceeds atmospheric pressure. The arrangement is also such that the valve will close normally and will be held closed by the external atmospheric pressure when a vacuum or partial vacuum is created within the Sylphon chamber 31f.

Periodic variations in the volumetric capacity of the chamber 31f are effected by means of a cam actuated bell crank lever 33, which is pivotally supported on a suitable bracket of the head frame 30 and whose bifurcated end is adjustably coupled to the head piece 31e, by means of a threaded pin 33a and spherically faced nuts 33b which provide what is in effect, a ball and socket joint between the engaged parts. For the purpose of guiding the reciprocations of the head piece, a pin 31g is secured thereto and projects downwardly through the chamber 31f and into a guiding aperture formed within the cap nut 31.

The bell crank 33 is actuated by a cam 34 mounted on a shaft 35 which is driven by any suitable source of power, preferably a variable speed motor. As shown the cam engaging arm of the bell crank 33 is provided with a cam roller 33'. For the purpose of varying the point of engagement of the cam with the cam arm—and thereby changing the corresponding throw of the latter—the roller 33' is of considerable length and the cam 34 is so mounted on the shaft 35 that it can be shifted up and down thereon and thereby move the point of contact between the cooperating elements 33' and 34 either closer to or farther from the fulcrum point of the bell crank 33;—thus varying the range of movement imparted to this member (33) and to the connected bellows elements 31a—31b.

In order to accomplish longitudinal adjustment of the cam along its operating shaft 35, I have provided a forked shift block 36 which is slidably mounted in suitable guides on the head frame 30, and which is provided with projecting arms that engage opposite ends of the cam and thus determine its position on the shaft 35.

It will, of course, be understood that the guides for the block 36 are parallel to the shaft 35, and that a spline 35a or similar means is provided for locking the cam against rotational movement, relatively to the shaft 35, and at the same time permitting its movement along the shaft. The block 36 is secured in any desired position by a cap bolt 36a which passes through a slot in the frame 30 and is threaded into the said block.

The cam roller 33' of the bell crank is yieldingly held against the cam 34, by means of compression coil springs 33c which are interposed between the head frame 30 and the outer ends of connecting rods 33d that are coupled to the lower arm of the bell crank 33. It will be noted that the cam 34, like the cam 15, is a one lobed single acting cam (se Fig. V) which can only act to lift the head piece 31e—and thereby expand the bellows elements—once for every revolution of the shaft 35; and that the lobe is so formed that the head piece is very quickly raised and is held in elevated position for only a relatively short part of each revolution of the shaft 35.

From the foregoing description, it will be apparent that the cam 34, acting through the bell crank 33, expands the Sylphon members 31a and 31b once during each revolution of the shaft 35 thus increasing the internal volume of the chamber 31f and consequently decreasing the fluid pressure within that chamber and within the communicating segregation chamber 27a; and that the head piece 31e is lifting and is held in the elevated position during approximately 90° of travel of the cam and that therefore the reduction in pressure within the chamber 27a is maintained for an appreciable period of time or as will be hereinafter pointed out for approximately one fourth of the complete cycle of operation of the feeder mechanism.

As the cam lobe moves out of engagement with the roller 33', the springs 33c are left free to act on the bell crank lever 33, and permit the latter to rock in a counterclockwise direction, as the head 31e is moved downwardly by the excess atmospheric pressure on the exterior thereof. But the tension of these springs is insufficient to produce any forced compression of the bellows elements 31a—31b, and even if any such forced compression should occur any increase in pressure in the bellows chamber 31f is prevented by the automatic opening of the vent valve 32. The glass in the segregation chamber 27a can therefore never be subjected to any superatmospheric pressure.

It will be apparent that a reduction in the fluid pressure within the chamber 31f, and consequently in the chamber 27a, will occasion a flow of glass from the chamber 22 into the segregation chamber 27a provided the relationship between the lower end of the bell and the upper end of the sleeve 25 is such as to permit such a flow, and as before stated, I have provided means for reciprocating the bell toward and away from the sleeve 25, and this means is so arranged that the sleeve is in its uppermost position at the time that the pressure within the chamber 31f and the segregation chamber 27a is reduced by the operation of the cam 34. Under such conditions, a free flow of molten glass from the chamber 22 and into the segregation chamber 27a is obtained when the last mentioned chamber is subjected to sub-atmospheric pressure.

As previously explained, the bell 27 is supported by the gear 29 and is rotated by that gear. The reciprocating motion of the bell is also automatically imparted thereto by the rotary movement of the parts in the following manner:

As shown in Figs. IV and VI, the gear member 29 is supported on the head frame 30 by means of rollers 37 which are journaled therein and which are engaged with an annular cam track 29a that is detachably secured to the tooth-carrying flange of this member. The roller engaging face or edge of the cam track 29a is provided with alternate lobes 29b and depressions 29c so located, with respect to the supporting rollers 37, that the gear 29 and consequently the bell 27 is alternately raised and lowered during the rotation of the gear.

The gear is driven by an elongated pinion 29d rigidly keyed to the shaft 35 and the lobes 29b are so located and so arranged on the cam track 29a that the gear is raised and lowered once for each rotation of the pinion 29d and consequently for each rotation of the cam 34. The arrangement is further such that the lifting of the bell is synchronized with the periodic reduction in fluid pressure, within the bell chamber 27a which is occasioned by the expansion of the Sylphon chamber 31f, and the lowering of the bell is approximately coincident with the release of the cam roller 33' from the cam 34. The pressure on the molten glass within the segregation chamber is therefore reduced, by the positive upward movement of the Sylphon head 31d, while the bell occupies its highest position and the annular port between its lower end and the top of the sub-forehearth sleeve 25 is wide open.

As previously stated, the arrangement of the cam lobes 29b, with relation to the gear supporting rollers 37, is such that the gear 29 and the bell 27 carried by it drop to their lowermost position concurrently with, or immediately after, the disengagement of the cam elements 33'—34, and the head piece 31d begins to move downwardly in response to the external pressure of the atmosphere therein. This collapsing movement of the Sylphon bellows elements almost immediately restores the pressure in the interior of the bell—i. e., the segregation chamber 27a—to that of the external atmosphere; and the mass of glass trapped therein (by the downward movement of the bell) then flows from the delivery orifice under the action of gravity alone.

When the glass within the bell is first subjected to a reduced or sub-atmospheric pressure, there is a tendency to momentarily check or retard the outflow of glass from the delivery orifice; and this tendency can be controlled and varied to a considerable degree by changing the phase relationship between the cam elements 29b and 34, and also by increasing or decreasing the depth of glass above the orifice. If the phase relation of the elements (29b and 34) is so adjusted that the Sylphon bellows is expanded—in whole or in part, before the bell is raised to establish free communication between the chambers 22 and 25a, the retractive influence of the partial vacuum in the still trapped mass of glass in the segregation chamber will be a maximum and may occasion a very marked retardation or even a momentary reversal, of the outflow of the glass stream. But if the bell member is raised, to fully open the inflow port between its lower end and the adjacent sleeve 25, before the glass therein is subjected to the reduced pressure, the effect of the latter, on the outflowing stream, will be very much less marked, because the area of the inflow port may be, and normally is, substantially greater than that of the outflow or delivery orifice 19a, and the major action of the sub-atmospheric pressure will be to draw glass from the forehearth chamber 22 into the segregation or accumulation chamber 27a.

The effect of reducing the pressure in the bell chamber (on the outflowing stream of glass) may be further minimized, or if desired almost eliminated, by increasing the depth of the sub-forehearth 2b—and thereby increasing the gravity head or gravity pressure on the glass above the delivery orifice—so that the ratio between the retarding and the extrusion forces is greatly decreased.

The increase in the depth of the sub-forehearth also diminishes the percentage change in the gravity head at different stages of the outflow, and thereby tends to maintain the rate of discharge from the delivery orifice—and the resultant diameter of the outflowing stream—more nearly uniform.

When the extruded stream of material is to be periodically cut, to form a series of mold charges, the shear or other cutting elements (38) which are employed for that purpose are preferably placed in close proximity to, but out of contact with, the delivery opening (as shown in Figs. I and IV); and are generally operated to sever the flowing material at the time when the glass in the segregation chamber is exposed to the reduced (sub-atmospheric) pressure, and there is a more or less pronounced "necking" of the stream flow. Under such conditions, the complete cycle of feeding operations is as follows:

Immediately upon the severance of a charge the bell 27 and its carrying gear 29 are moved upwardly thus establishing a condition of free flow between the chamber 22, the segregation chamber 27a, and the sub-forehearth chamber 25a and the Sylphon bellows is concurrently expanded to reduce the pressure therein. As a result molten glass moves freely into the segregation chamber and the level to which that glass will be lifted above the level of the glass within the chamber 22 is determined by the degree of vacuum established by the forced expansion of the bellows chamber 31f. The lifting of the bell also increases the discharge through the delivery orifice 19a because of the free communication which is then established with the parent body of glass in the chamber 22. As soon as a sufficient quantity of glass has entered the segregation chamber 27a the bell 27 is permitted to move downwardly; and immediately thereafter atmospheric pressure is against re-established within the Sylphon chamber 31f and consequently within the segregation chamber 27a (by the collapse of the bellows elements 31a—31b) with the result that the further flow of material from the orifice 19a will be under the head of glass that is now trapped in the interior of the bell and sleeve members 27 and 25. This gravity discharge of the molten material is continued until a sufficient quantity has been delivered to form the requisite mold charge, which is then severed as before during the next application of sub-atmospheric pressure to the glass above the delivery orifice. This completes one cycle of feeding action. It will, of course, be understood that it is not desirable to allow the lower end of the bell to come into contact with the upper end of the sleeve 25; but it is advantageous to move the bell as close to this sleeve as is permissible in order that the expelling force of the head of glass contained within the segregation chamber will not be materially reduced by creating an appreciable back flow from this chamber into the body of material in the main forehearth.

In the illustrative construction shown in Fig. IV, the head frame 30 is mounted on a plurality of posts 39—preferably three—each of which is supported by the forehearth structure and each of which is so arranged that its length—(above its support)—may be adjusted for the purpose of leveling and also adjusting the height of the head frame. As there shown, the lower end of each post 39 is loosely mounted in a suitably apertured block 39a, and is threaded to engage a capstan nut 39b, which is supported by the block 39a, and constitutes an adjustable support for the post. This arrangement provides means for either tilting the frame 30 (to bring the bell 27 into axial alignment with the sleeve 25), or of raising or lowering it to control the maximum and minimum opening of the annular port between the members 25 and 27. I have also provided a turnbuckle bolt connection 40 between the head frame and the forehearth structure for the purpose of locking the head frame in the desired position after the proper adjustment has been made by the capstan nuts 39b.

It will be apparent that it is desirable to occasionally adjust or vary the vertical height of the head frame 30 both for the purpose of compensating for wear at the upper edge of the sleeve 25 and the lower edge of the bell, and also for the purpose of compensating for such varying conditions of the glass within the chamber 22 as may be encountered during normal operation. While this adjustment may be made with the capstan nuts 39b, I have shown a modified form of structure in Figs. IX and X which facilitates this vertical movement of the head frame and makes it possible to adjust it during the operation of the feeder and without running the chance of disturbing the axial alignment of the members 27 and 25.

The construction illustrated in Figs. IX and X is in the main similar to that disclosed in Fig. IV except as respects the mounting for the gear supporting rollers. In this modification, each such roller 37' is journaled in a saddle 41 that is provided with a screw threaded shank 41a, which is slidably but non-rotatably mounted in guideways on the head frame 30' and which are engaged by a worm gear nut 41b that is held against longitudinal movement in recessed portions of these guideways. There are two of these supporting rollers and saddle supports which are arranged at diametrically opposite points in the periphery of the cam ring 29a, and the worm gear nuts 41b are cross connected by a worm shaft 42a so that the two gear wheel supports may be simultaneously raised or lowered by turning this shaft. With this arrangement, the position of the bell 27 with relation to the sleeve 25 (Fig. IV) may be easily adjusted at any time during the operation of the feeder, and without interfering with the position of the head frame 30'.

The supporting posts 39' for the head frame 30' may in this case be rigidly attached to the forehearth post; but the upper threaded ends of these posts are connected to the frame by means of the nuts 43 which are positioned on opposite sides of suitable flanges thereon, and which may be employed both in the alignment of the bell and sleeve members 27 and 25 and in clamping the parts in adjusted position.

In Fig. IX, the gear member 29 is shown in its lowered position (with the supporting rollers 37' engaging with the depressed portions 29c of the cam track 29a) and the Sylphon bellows (31a—31b) which is mounted on the upper face of that gear, is collapsed with the valve 32 slightly opened for the purpose of establishing communication between the chamber 31f and the atmosphere. In this connection, it may be stated that if it is desired to forcibly open this valve at this stage in the cycle of operation (supra), such an action can be readily effected by increasing the tension of the adjustable "take up" springs 33c, to such a degree as will enable them to exert a positive compressive force on the collapsing bellows and thus momentarily raise the pressure therein slightly above that of the outside air. In order to localize and concentrate the effect of this momentarily increased internal pressure on the relief valve 32 (and substantially eliminate any concurrent effect on the glass in the segregation chamber 27a)—I have provided a light gravity controlled check valve 44, which is adapted to seat on a shoulder on the member 28 and which is provided with a valve stem which extends upwardly into a guiding aperture in the finger 31g. This valve is easily lifted from its seat by any reduction in pressure within the chamber 31f, but is immediately closed when the pressure therein exceeds that in the chamber 27a. This valve is, however, preferably provided with one or more small apertures which permit a continuous slow equalization of the fluid pressure in the chambers 31f and 27a, and thus prevent any building up of a vacuum in the latter during the period of free gravity discharge of the trapped or segregated mass of glass from the segregation chamber.

In operating the type of feeder herein disclosed—which may be descriptively designated as a periodically actuated natural flow feeder—molten glass of the desired temperature is delivered from a tank furnace, or any other suitable source of continuous supply, to the forehearth chamber 1 or 1a the gate (2a or 22a) is adjusted to such a position as will cause it to operate both as a supplementary control element and as a skimmer block. The operating shaft (16 or 35) is driven at such a speed as to produce the desired number of mold charges, (stream sections) per unit of time—(viz. one for each revolution of the said shaft)—and in its rotation it effects successive periodical expansions of a bellows member (7 or 31a—31b) which result in the establishment of a sub-atmospheric pressure, or partial vacuum, in the segregation or accumulation chamber (3 or 27a) and in a resultant acceleration of the inflow of glass thereto which is accompanied by a more or less pronounced retardation of the outflow of glass from the delivery orifice (19 or 19a). As soon as a sufficient quantity of glass has been drawn into the segregation chamber by the forced expansion of the bellows member (7 or 31a—31b) the latter is released and permitted to collapse under the external pressure of the atmosphere; and the glass in the said chamber is expelled from the delivery orifice (19 or 19a) under the action of gravity alone;—provision being made for positively preventing any application of super-atmospheric pressure to the surface of the molten material during this, or any other, stage of the operation. In this last respect, my improved procedure and the apparatus employed in its practice, present all of the characteristics that distinguish the operation of "natural flow" feeders, but my present improvements present the additional feature of periodically varying the gravity head (force) under which this natural flow is maintained, by regularly recurrent applications of a subatmospheric pressure to the mass of glass above the delivery orifice. And as has been previously pointed out, I have also made provision which enables me to vary and control, within wide limits, the retarding or checking effect of this periodically applied partial vacuum, on the discharge of the molten material during the accumulation period; or, more broadly stated, to vary and regulate the relative effects of the subatmospheric pressure applications on the concurrent inflow and outflow of glass, to and from the accumulation and delivery chamber of my apparatus.

With this understanding of the operative character and the functional characteristics of my improved organization it will be apparent that apparatus embodying my invention may be so constructed and adjusted as to perform the following sequence of steps in the formation of a mold charge:

(a) Initiating the formation of a charge—after the severance of the stream by a suitable shear mechanism—by an unassisted or natural gravity flow from a mass of glass previously accumulated above the delivery orifice.

(b) Continuing the formation of the charge under a gradually decreasing gravity head, while preventing any application of a superatmospheric pressure, or any other extraneous force, which may act to accelerate or modify the natural gravity flow.

(c) Completing the formation of the charge without permitting the level of the glass above the discharge orifice to fall below that of the parent body in the main supply chamber.

(d) Replenishing the mass of glass above the delivery orifice (i. e., the mass of glass in the segregation chamber) and raising the level of this mass above that of the parent body, and concurrently retarding or checking the outflowing stream, to a greater or less degree.

(e) Severing the stream issuing from the orifice during this momentary checking or reversal of flow therefrom.

As respects the organization shown in Figs. IV, V, VI, VII, IX and X it will be further apparent that the apparatus there disclosed also presents the following additional characteristics of construction and operation, to wit:

(f) A material and controllable increase in the gravity head (pressure) which is effective in establishing and maintaining the natural flow from the delivery orifice (19a);—this increased controllable effect being obtained by the use of subforehearths (1a) of varying depth.

(g) A material decrease in the percentage change of the gravity head during the continuance of mold charge formation.

(h) A more effective utilization of the increased gravity head that is produced by the accumulation of glass in the segregation chamber (27a) by the action of the periodically applied sub-atmospheric pressure;—due to the prevention of any material backflow to the main supply chamber, by the lowering of the bell 27, and the substantial closure of the annular port opening between the adjacent ends of the members 27 and 25.

(i) A regulatable—and when desired a material—reduction in the effect of the periodically applied sub-atmospheric pressure in the discharge of glass from the delivery orifice, 19a;—produced in part by changing the relative areas of the inflow port opening (between the sleeve 25 and the raised bell 27, and the outflow opening (19a), and in part by the variable vertical distance between these two openings.

(j) The easy regulation of the rate of discharge from the delivery orifice, without interrupting the continuous operation of the feeder, either (1) by bodily raising or lowering the head frame 30 which supports the rotating and reciprocating bell member 27, and thereby varying the maximum and minimum areas of the inflow passage from the chamber 22 to the accumulation chamber 27a, (as compared to the area of the delivery opening 19a); or (2) by moving the cam 34 along the shaft 35 and thereby changing the expansion stroke of the Sylphon bellows 31a—31b; or (3) less readily, by regulating the supply of fuel to the heating burners for the main forehearth, and the flow of current to the heating coil 25b for the sub-forehearth, and thereby varying the temperature, and the resultant viscosity of the molten glass.

(k) A more rapid and perfect equalization of any temperature or other variations in the body of glass in the main supply chambers (1a and 22) because of continuous stirring action of the revolving bell 27, and also because of the free circulation of the heating gases through these chambers.

(l) A substantial decrease in the loss of heat from the forehearth chambers; 1st, because of the effective sealing of the roof openings through which the members 22a and 27 pass (by the cup and sleeve members 1c and 28); and 2nd, because of the decreased absorption and radiation of heat by and from the highly polished inner and outer surfaces of the sheet metal boots which form the outer walls of the forehearth assembly.

(m) A more effective and reliable control of the sub-atmospheric pressure applications, which is secured by substituting an imperforate hermetically sealed Sylphon bellows pump for a flexible diaphragm (or reciprocating piston) pump; and a substantial increase in the maximum range of volumetric capacity variations (i. e., in the degree of sub-atmospheric pressure attainable) by the use of telescoping arrangement of the Sylphon elements 31, 31a, 31b.

It will also be apparent that the changes in the operation conditions above outlined may be further supplemented by changing the form and relative proportions of various parts of the apparatus; e. g., by using orifice bushings (2b) with varying sizes of delivery openings (19a); or by employing different cam tracks 29 on which the relative heights and lengths of the cam lobes 29b and of the intervening spaces 29c are varied; or by using cams 34 of different peripheral contour, (to change the rate or speed of expansion movement of the bellows 31a—31b) or by altering the phase setting of the cam 34 so as to change the relative times of expanding the bellows member and of raising and lowering the bell 27 (for the purposes already explained); or by providing any well known form of shear actuating mechanism (not here shown) which can be operated in any desired time relationship to the moving parts of the apparatus herein described. It is further obvious that the mass or volume of the successively formed and severed stream sections (mold charges) may be readily controlled—independently of all other means above described—by varying the speed (R. P. M.) of the main driving shaft 35.

The type of feeder which I have here disclosed is capable of and adapted to, the production of successively delivering mold charges of widely varied form, or cross sectional contour, and weight,—but in using this feeder I prefer to so proportion and control the action of the cooperating parts as to make these charges as thick and as short (i. e., as "chunky" in form) as is permitted by the size of the opening in the receiving receptacle; and in order to achieve this purpose I generally employ a delivery orifice of relatively large size and sever the flowing stream at relatively short intervals and at a point as close as possible to the plane of discharge. The advantages of thus operating a natural flow feeder have been fully explained in my earlier Patents Nos. 1,241,790, 1,311,474, 1,334,725, 1,375,-336, etc. and do not for that reason require further explanation here.

While I have only described in detail one specific series of steps in the formation and delivery of successive mold charges those skilled in the art will now readily appreciate that various changes in the procedure outlined by me—and various changes in, additions to, and omissions from, the apparatus here illustrated as suitable therefor—may be made without departing from the spirit and scope of my invention and I desire it to be understood that I have designed various feeder mechanisms and various feeding procedures for feeding molten glass in a continuously flowing pulsating stream and that such mechanisms and procedures form the subject matter of and are claimed in copending applications for Letters Patent and structurally and functionally distinguish from the features herein claimed.

What I claim as new and desire to secure by Letters Patent is:

1. A feeder for molten glass comprising a receptacle for molten glass having an orifice formed in the bottom thereof, a chamber located within said receptacle extending above said orifice and communicating with said receptacle and said orifice, means for periodically exhausting said chamber to a sub-atmospheric pressure and a check valve communicating with the atmosphere for preventing the fluid pressure within said chamber exceeding atmospheric pressure.

2. A feeder for molten glass comprising a receptacle for molten glass, having a delivery orifice formed in the floor thereof, an inverted bell substantially aligned with said orifice and projecting below the surface of the glass contained within said receptacle, means for rotating said bell, means for periodically reciprocating said bell toward and away from said orifice, means operating in synchronism with said last mentioned means for periodically exhausting the interior of said bell to a sub-atmospheric pressure, and a one way valve communicating with the atmosphere and the interior of said bell for preventing the fluid pressure within said bell exceeding atmospheric pressure.

3. A feeder for molten glass comprising a receptacle for molten glass, having an orifice formed in the floor thereof, an inverted bell projected downwardly into said receptacle and below the surface of the glass contained within said receptacle and aligned with said orifice, means for rotating said bell, means for periodically moving said bell away from said orifice, means for subjecting the interior of said bell to sub-atmospheric pressure as said bell moves away from said orifice and means for preventing the fluid pressure within said bell exceeding atmospheric pressure.

4. A feeder for molten glass comprising a receptacle for molten glass, having an opening formed in the floor thereof, a sub-forehearth communicating with said opening and having a delivery orifice formed in the lower end thereof, an inverted bell extending downwardly into said receptacle and substantially aligned with said sub-forehearth, means for periodically moving said bell towards and away from said sub-forehearth, means for periodically subjecting the interior of said bell to sub-atmospheric pressure, and a shear mechanism located below said orifice.

5. A feeder for molten glass comprising a receptacle for molten glass having a flow orifice communicating therewith, a segregation chamber located within said receptacle, aligned with said orifice, and projecting below the surface of the glass contained within said receptacle, a compound Sylphon communicating with said chamber, means for periodically expanding and contracting said Sylphon and means for preventing the fluid pressure in said chamber exceeding atmospheric pressure during periods of contraction of said Sylphon.

6. A feeder for molten glass, comprising a receptacle for molten glass, having an opening formed in the bottom thereof, a sub-forehearth removably secured to said receptacle and communicating with the interior thereof through said opening, means for heating said sub-forehearth, and means located wholly above said sub-forehearth for controlling the delivery of glass from said receptacle to said sub-forehearth.

7. A feeder for molten glass, comprising a receptacle for molten glass, communicating with a molten glass-submerged delivery orifice, an inverted bell extending into said receptacle and aligned with said orifice, means for rotating said bell, a compound Sylphon communicating with the interior of said bell, an atmospheric relief valve communicating with said Sylphon, a check valve located between said Sylphon and said bell and means for periodically expanding and contracting said Sylphon.

8. In a feeder for molten glass, an inverted bell aligned with the flow orifice of said feeder, means for rotating and reciprocating said bell, means for adjusting the position of said bell above such orifice, adjustable means for subjecting the interior of said bell to sub-atmospheric pressure and a one way valve communicating with the atmosphere and the interior of said bell for preventing fluid pressure in said bell exceeding atmospheric pressure.

9. In combination in a glass feeder, a receptacle for molten glass communicating with a source of molten glass and provided with a submerged flow orifice, an adjustable gate for controlling communication between said source and said receptacle, an inverted bell extending into said receptacle and aligned with said orifice, means for periodically subjecting the interior of said bell to sub-atmospheric pressure, a one way valve communicating with said chamber and the atmosphere, and means for rotating and reciprocating said bell.

10. In combination in a feeder for molten glass, a receptacle for a body of molten glass having an orifice formed therein adapted to be submerged by glass contained therein, a segregation chamber located within said receptacle, means for periodically subjecting the interior of said chamber to variations in fluid pressure, comprising telescopically mounted Sylphon members enclosing a chamber of variable volumetric capacity, means for expanding and contracting said members, means for varying the degree of expansion of such members, a shear mechanism located below said orifice and means operating in synchronism with said Sylphon expanding means for actuating said shears.

11. In combination in a feeder for molten glass, an inverted bell located above and aligned with the flow orifice of said feeder, and means for rotating and reciprocating said bell, comprising a gear supporting the bell, an annular cam track secured to one face of said gear, a series of rollers supporting said cam track said gear and inverted bell, means for rotating said gear and means for adjusting the position of said cam track.

12. In combination in a feeder for molten glass, an inverted bell located above and aligned with the flow orifice of said feeder, means for rotating and reciprocating said bell, comprising a gear supporting said bell, a cam track secured to the under face of said gear, a series of rollers supporting said cam track, a head frame supporting said rollers, and means for supporting and adjusting the position of said head frame.

13. In combination in a feeder for molten glass, a forehearth, a tank communicating therewith for continuously supplying molten glass thereto, an inverted bell projecting into said forehearth and below the surface of the glass contained therein, means for establishing and maintaining a balanced symmetrical movement of heating gases around said bell, through said forehearth and into said tank to thereby assist in maintaining a uniform temperature of the glass within said forehearth.

14. In combination in a feeder for molten glass, a forehearth, a tank communicating therewith for continuously supplying molten glass thereto, an inverted bell projecting into said forehearth and below the surface of the glass contained therein, means for establishing and maintaining a balanced symmetrical movement of heating gases around said bell, through said forehearth and into said tank, to thereby assist in maintaining a uniform temperature of the glass within said forehearth and means for preventing the escape of heating gases from said forehearth and adjacent said bell to the external air.

15. In combination in a feeder for molten glass, a receptacle for molten glass having an orifice formed in the bottom thereof, a sub-forehearth detachably secured to said receptacle, extending below the bottom thereof and having an open ended passage communicating with said orifice, an orifice bushing removably mounted in the lower end of said passage and means located within said receptacle and wholly above said sub-forehearth for controlling the flow of glass from said receptacle through said bushing.

16. In combination in a feeder for molten glass, a forehearth comprising a receptacle for molten glass having an opening formed therein below the normal level of the glass contained therein, a sub-forehearth removably secured to said forehearth extending below the bottom thereof and having an open ended passage with one end communicating with said opening and the other end constituting a delivery orifice, an orifice bushing removably mounted in the orifice end of such passage, shears located below said sub-forehearth, means for applying heat to molten glass traversing said passage and means located within said receptacle and above said sub-forehearth for controlling the delivery of glass through said delivery orifice.

17. A method of forming a succession of separate mold charges from a body of molten glass, which consists in occasioning a gravity flow of molten glass through an orifice and from a body of such glass submerging such orifice, momentarily reducing such flow while accumulating a mass of such glass from such body and above said orifice, simultaneously severing the stream of glass issuing from the orifice at a point below but adjacent to said orifice, restricting the flow from said body to said orifice while establishing a flow through said orifice under the gravity head of said mass alone and while preventing the application of an expelling force, other than gravity, on the glass of said mass, removing such restriction between the body and the orifice and then repeating the cycle to produce a succession of mold charges.

18. The method of feeding molten glass, which consists in causing glass to flow from a body of molten glass through a submerged orifice, applying sub-atmospheric pressure to the surface of the glass above the orifice to accumulate and segregate a mass of glass from said body above said orifice, severing the stream of glass issuing from the orifice at a plane adjacent the orifice and during the period of such accumulation, establishing a gravity flow from said mass through said orifice while adjustably restricting communication between said mass and said body, and then repeating the cycle to form a succession of mold charges.

19. In combination in a feeder, a container for molten glass, a forehearth communicating therewith and having an enlarged substantially semi-cylindrical forward end with a glass delivery orifice formed in the bottom thereof substantially concentric with the semi-cylindrical portion thereof, an inverted bell extending downwardly into the glass within said forehearth and substantially axially aligned with said orifice, and means for establishing and maintaining a balanced symmetrical flow of heating gases through the semi-cylindrical portion of said forehearth and around said bell, to thereby assist in maintaining a uniform temperature of glass within said forehearth.

20. The method of feeding molten glass which consists in establishing a flow of molten glass from a supply body and through an open flow orifice under a predetermined gravity head, periodically raising the level of the glass over the orifice above the level of said supply body to increase the head of glass over the orifice while maintaining the flow therethrough from the supply body, and then restricting the flow from said supply body to said orifice while utilizing such additional head to increase the flow through the orifice.

21. The method of feeding molten glass which consists in establishing a flow of glass from a supply body and through an open flow orifice under a predetermined gravity head, periodically applying suction to the glass over the orifice to increase the gravity head thereover and while maintaining the flow from said body through said orifice, restricting the flow from said body to said orifice while utilizing such increased head to vary the flow through the orifice, removing such restriction to re-establish the flow from said body through said orifice, and periodically severing successive mold charges from the stream of glass issuing through said orifice.

FRANK L. O. WADSWORTH.